US006891836B1

(12) United States Patent
Chen et al.

(10) Patent No.: US 6,891,836 B1
(45) Date of Patent: May 10, 2005

(54) SWITCHING COMPLEX ARCHITECTURE AND OPERATION

(75) Inventors: David X. Chen, Plano, TX (US); Masahiro Shimbashi, Kanagawa (JP)

(73) Assignee: Fujitsu Network Communications, Inc., Richardson, TX (US)

( * ) Notice: Subject to any disclaimer, the term of this patent is extended or adjusted under 35 U.S.C. 154(b) by 0 days.

(21) Appl. No.: 09/325,698

(22) Filed: Jun. 3, 1999

(51) Int. Cl.$^7$ .............................. H04L 12/28; H04J 3/00
(52) U.S. Cl. .................. 370/395.51; 370/389; 370/386; 370/280
(58) Field of Search ............................ 370/395.1, 354, 370/466, 376, 535, 375, 314, 419, 420, 401, 400, 403, 404, 406, 216, 217, 244, 219, 220, 221, 222, 223, 224

(56) References Cited

U.S. PATENT DOCUMENTS

| | | | |
|---|---|---|---|
| 4,339,633 A | 7/1982 | Ahmed .................... | 179/99 M |
| 4,592,048 A | 5/1986 | Beckner et al. ............... | 370/60 |
| 4,631,641 A | 12/1986 | Brombal et al. ............ | 361/424 |
| 4,926,416 A | 5/1990 | Weik ......................... | 370/60.1 |
| 4,959,833 A | 9/1990 | Mercola et al. ............... | 371/32 |
| 5,159,595 A | * 10/1992 | Flanagan et al. ........... | 370/224 |

(Continued)

FOREIGN PATENT DOCUMENTS

| | | | |
|---|---|---|---|
| EP | 0 528 206 A3 | 2/1993 | ........... H04L/12/64 |
| EP | 0 529 649 A2 | 3/1993 | ............. H04J/1/00 |
| EP | 0 818 940 A2 | 1/1998 | ........... H04Q/11/04 |
| WO | WO 95/26600 | 10/1995 | ........... H04L/12/56 |
| WO | WO 95/30318 | 11/1995 | ........... H04Q/11/04 |

OTHER PUBLICATIONS

International Search Report in International Application No PCT/US 00/15332, dated Sep. 21, 2000, 6 pages.
McDysan, David E., et al., *ATM Theory and Application*. McGraw–Hill, Inc. ISBN 0–070–60362–6, pp. 365–385., 1994.
Erdengiz, Ali, "ATM Usage Policing and Traffic Shaping," Communications System Design (Jan. 1997).
Dobrowski, George et al., *ATM User–Network Interface Specification, Version 3.1*, The ATM Forum, Sep., 1994.
Cerent 454™ High Speed SONET/SDH Transport System, ALTS trade show, Las Vegas, Nevada on or about Dec., 1998.
"FLM 150 ADM LAN Extension Product Design Specification," Revision 1.1, Internal Design Specification for Product, sheets 6/353–10/353 and 72/353–75/353, Product publicly released on or about Dec., 1998.

(Continued)

*Primary Examiner*—Hanh Nguyen
(74) *Attorney, Agent, or Firm*—Baker Botts L.L.P.

(57) ABSTRACT

A system operable to communicate time-division multiplexed information and asynchronous transfer mode cells includes a primary rate switching fabric operable to receive a first plurality of transport signals and to switch the first plurality of transport signals at a first level, a sub-rate switching fabric operable to receive a second plurality of transport signals carrying time-division multiplexed information and to switch the second plurality of transport signals at second level that is a more granular level than the first level, and an asynchronous transfer mode switching fabric operable to receive a third plurality of transport signals carrying asynchronous transfer mode cells, and to switch asynchronous transfer mode cells among the third plurality of transport signals carrying asynchronous transfer mode cells.

23 Claims, 3 Drawing Sheets

U.S. PATENT DOCUMENTS

| | | | | |
|---|---|---|---|---|
| 5,187,706 A | * | 2/1993 | Frankel et al. | 370/217 |
| 5,345,446 A | | 9/1994 | Hiller et al. | 370/60.1 |
| 5,365,524 A | | 11/1994 | Hiller et al. | 370/94.2 |
| 5,396,491 A | | 3/1995 | Newman | 370/355 |
| 5,398,236 A | | 3/1995 | Hemmady et al. | 370/218 |
| 5,412,652 A | | 5/1995 | Lu | 370/85.12 |
| 5,467,348 A | | 11/1995 | Fujii et al. | 370/60.1 |
| 5,519,700 A | | 5/1996 | Punj | 370/419 |
| 5,526,359 A | | 6/1996 | Read et al. | 370/100.1 |
| 5,594,729 A | | 1/1997 | Kanakia et al. | 370/391 |
| 5,729,536 A | | 3/1998 | Doshi et al. | 370/328 |
| 5,793,760 A | | 8/1998 | Chopping | 370/355 |
| 5,796,720 A | | 8/1998 | Yoshida et al. | 370/245 |
| 5,805,568 A | | 9/1998 | Shinbashi | 370/223 |
| 5,809,021 A | * | 9/1998 | Diaz et al. | 370/364 |
| 5,812,796 A | | 9/1998 | Broedner et al. | 395/283 |
| 5,838,924 A | | 11/1998 | Anderson et al. | 395/200.69 |
| 5,844,887 A | | 12/1998 | Oren et al. | 370/218 |
| 5,864,553 A | | 1/1999 | Aramaki | 370/392 |
| 5,867,484 A | | 2/1999 | Shaunfield | 370/254 |
| 5,920,412 A | | 7/1999 | Chang | 359/128 |
| 5,953,330 A | | 9/1999 | Canniff et al. | 370/352 |
| 5,963,553 A | | 10/1999 | Wicklund | 370/390 |
| 6,002,689 A | * | 12/1999 | Christie et al. | 370/401 |
| 6,041,055 A | * | 3/2000 | Chopping | 370/391 |
| 6,125,111 A | | 9/2000 | Snow et al. | 370/360 |
| 6,134,238 A | | 10/2000 | Noh | 370/395 |
| 6,141,346 A | | 10/2000 | Caldara et al. | 370/390 |
| 6,208,657 B1 | * | 3/2001 | Dendi et al. | 370/401 |
| 6,266,333 B1 | | 7/2001 | Kartalopoulos | 370/395 |
| 6,324,185 B1 | * | 11/2001 | Budhraja | 370/468 |
| 6,470,018 B1 | * | 10/2002 | Wiley et al. | 370/396 |
| 6,643,297 B1 | * | 11/2003 | Sproat et al. | 370/498 |

OTHER PUBLICATIONS

"Product Design Specification (PDS) for Flash–192, Release 1," Internal Design Specification for Product, pp. 1/916; 4–12/9161 315–320/916, Product publicly released on or about Mar., 1999.

"InterNetworking Systems; AnyMedia® Access Products; AnyMedia Access System," http://www.lucent.com/ins/products/products/anymedia.html, Printed Aug. 10, 2000.

"AnyMedia® Access System," Lucent Technologies, Inc. Marketing Communications, Sep., 1999.

"The ÁnyMedia™ Access System Anything's Possible," Lucent Tchnologies, Inc. Marketing Communications, 1997.

Photography of Northern Telecom Card, card dated Apr., 1998.

Held, G., *Understanding Data Communications*, Fifth Edition, Sams Publishing. ISBN No. 0–672–30934–3, Chapter 14, pp. 419–431, 1996.

McCloghrie, K., et al., "Management Information Base for Network Management of TCP/IP–based internets: MIB–II," SNMP Working Group, Mar.; 1991.

"Draft New Recommendation 1.630 (ATM Protection Switching)," ITU Telecommunication Standardization Sector, COM 13–41–E, Sep., 1998.

Guérin, R., et al., "Equivalent Capacity and its Application to Bandwidth Allocation in High–Speed Networks," IEEE Journal on Selected Areas in Communications, vol. 9, No. 7, pp. 968–981, Sep., 1991.

Gün, L., et al., "Bandwidth Management and Congestion Control Framework of the Broadband Network Architecture," Computer Networks and ISDN Systems 26, Elsevier Science Publishers B.V., North–Holland, pp. 61–78, 1993.

"S/DMS TransportNode 'OC–3 Express'—Cost–Effective SONET Transport for Low–Capacity Applications", Northern Telecom Marketing Publications, Issue 1, pp. 1–31, Sep. 27, 1996.

*Universal Serial Bus Specification Revision 1.1*, Compaq Computer Corporation, Intel Corporation, Microsoft Corporation, NEC Corporation, Sep. 23, 1998.

"MMC Products," http://www.mc–net.com/top–roducts/productdescriptions.html, Printed Jul. 22, 1999.

"MMC Network's Products: AnyFlow 5400," http://www.mmcnet.com/Solutions/anyflow5400.asp, Printed Feb. 7, 2000.

"MMC Network's Products: AnyFlow 5500," http://www.mmcnet.com/Solutions/anyflow5500.asp, Printed February 7, 2000.

"AnyFlow 5400 Product Overview," MMC Networks, Undated.

"AnyFlow 5500 Product Overview," MMC Networks, Undated.

SwitchStAR™ ATM Cell Based 8 =8 Non–Blocking Single Chip Switching Memory, Preliminary IDT77V400, Commercial Temperature Range, Integrated Device Technology, Inc., pp. 1–23, May, 1998.

SwitchStAR™ ATM Cell Based 8 =8 Non–Blocking Single Chip Switch Controller, Preliminary IDT77V500, Commercial Temperature Range, Integrated Device Technology, Inc., pp. 1–14, May, 1998.

Giroux, Natalie et al., *Traffic Management Specification, Version 4.0*, af–tm–0056.000, The ATM Forum, Apr., 1996.

*M4 Interface Requirements and Logical MIB*, af–nm–0020.000, The ATM Forum, Oct., 1994.

PCT Written Opinion in International Application No. PCT/US00/15426, dated Jun. 26, 2001, 5 pages.

PCT Written Opinion in International Application No. PCT/US00/15332, dated Aug 13, 2001, 4 pages.

PCT International Search Report in International Application No. PCT/US00/15340, dated Oct. 19, 2000, 6 pages.

International Search Report in PCT International Application No. PCT/US00/15339, dated Nov. 17, 2000, 6 pages.

International Search Report in International Application No. PCT/US 00/15129, dated Aug. 21, 2000, 7 pages.

Tai H. Noh, "ATM Scenarios for SDH/SONET Networks XP–000750438," *Bell Labs Technical Journal*, Jan., 1998, 13 pages.

Bernie Assa, "Today's Transport Networks—Are They Ready for ATM?," *National Fiber Optic Engineers Conference Proceedings*, Sep. 8–12, 1996, 16 pages.

International Preliminary Examination Report in International Application No. PCT/US00/15332, dated Jan. 10, 2002, 4 pages.

* cited by examiner

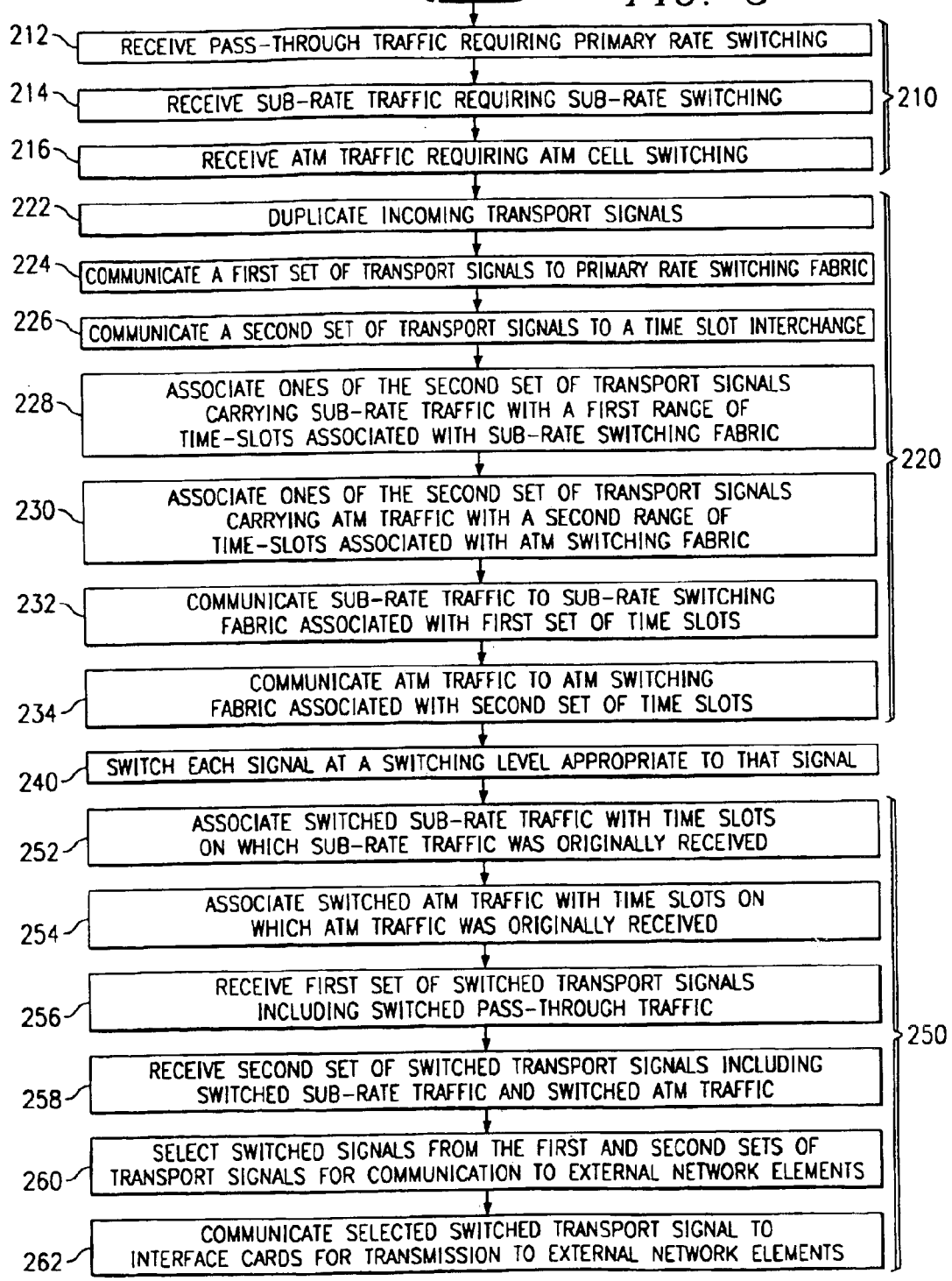

SWITCHING COMPLEX ARCHITECTURE AND OPERATION

BACKGROUND OF THE INVENTION

Typical communication networks may transmit information in one or more signal formats, such as an optical carrier level-n (OC-n) format, an synchronous transport signal level-n format (STS-n), a digital service level-n (DS-n) format, frame relay format or combination of these or other signal formats. In addition these various signal formats may contain, for example, time-division multiplexed information, asynchronous transfer mode cells, or other types of information formats. As communication systems evolve and interface with various network elements, issues arise in handling various signal formats requiring various levels of signal processing.

One approach to addressing these issues is to incorporate separate switching complexes at nodes within the network, each switching complex operable to process a particular signal type or a particular granularity of signal. For example, a network node may include one switching complex operable to process traffic carrying time division multiplexed information, and a separate switching complex operable to process traffic carrying asynchronous transfer mode cells. This approach is expensive, difficult to manage, and generally requires an inordinate amount of space.

Another approach is to carry time-division multiplexed information over asynchronous transfer mode traffic. This approach is typically accomplished using asynchronous transfer mode circuit emulation techniques. A problem with this approach is that mapping time-division multiplexed information onto asynchronous transfer mode traffic generally introduces error-causing jitter into the system. In addition, since the time-division multiplexed information is mapped into an asynchronous format, this approach eviscerates synchronous optical network (SONET) ring protection, which would otherwise be available.

SUMMARY OF THE INVENTION

In accordance with the present invention, a system operable to communicate time-division multiplexed information and asynchronous transfer mode cells comprises a primary rate switching fabric operable to receive a first plurality of transport signals and to switch the first plurality of transport signals at a first level, a sub-rate switching fabric operable to receive a second plurality of transport signals carrying time-division multiplexed information and to switch the second plurality of transport signals at second level that is a more granular level than the first level, and an asynchronous transfer mode switching fabric operable to receive a third plurality of transport signals carrying asynchronous transfer mode cells and to switch asynchronous transfer mode cells among the third plurality of transport signals carrying asynchronous transfer mode cells.

Technical advantages of the present invention include the provision of a system and method for facilitating transmission of a flexible mixture of various signal types and granularities. In a particular embodiment, the invention facilitates communication of primary rate, sub-rate, and asynchronous transfer mode cell carrying traffic using a single switching complex. Through the invention's unique configuration, sub-rate traffic and asynchronous transfer mode traffic can be processed without affecting the flow of pass-through traffic. In a particular embodiment, the invention provides separate time slot interchanges to handle processing of primary rate signals and sub-rate/asynchronous transfer mode signals.

The invention can be constructed to have a modular design. For example, the sub-rate switching fabric and the asynchronous transfer mode switching fabric can each reside on a separate physical cards. This design provides an advantage of facilitating interchangability between the switching fabrics. This type of design facilitates customizing bandwidth allocation in the switching complex according to the traffic patterns of any particular application, which facilitates application of the invention to a wide variety of network applications and accommodates changes in network demands as systems evolve.

Other technical advantages are readily apparent to one of skill in the art from the attached figures, description, and claims.

BRIEF DESCRIPTION OF THE DRAWINGS

For a more complete understanding of the present invention, and for further features and advantages thereof, reference is now made to the following description taken in conjunction with the accompanying drawings, in which:

FIG. 3 is a flow chart showing an exemplary method of communicating time-division multiplexed information and asynchronous transfer mode cells in a communication network.

DETAILED DESCRIPTION OF THE INVENTION

Figure 1:
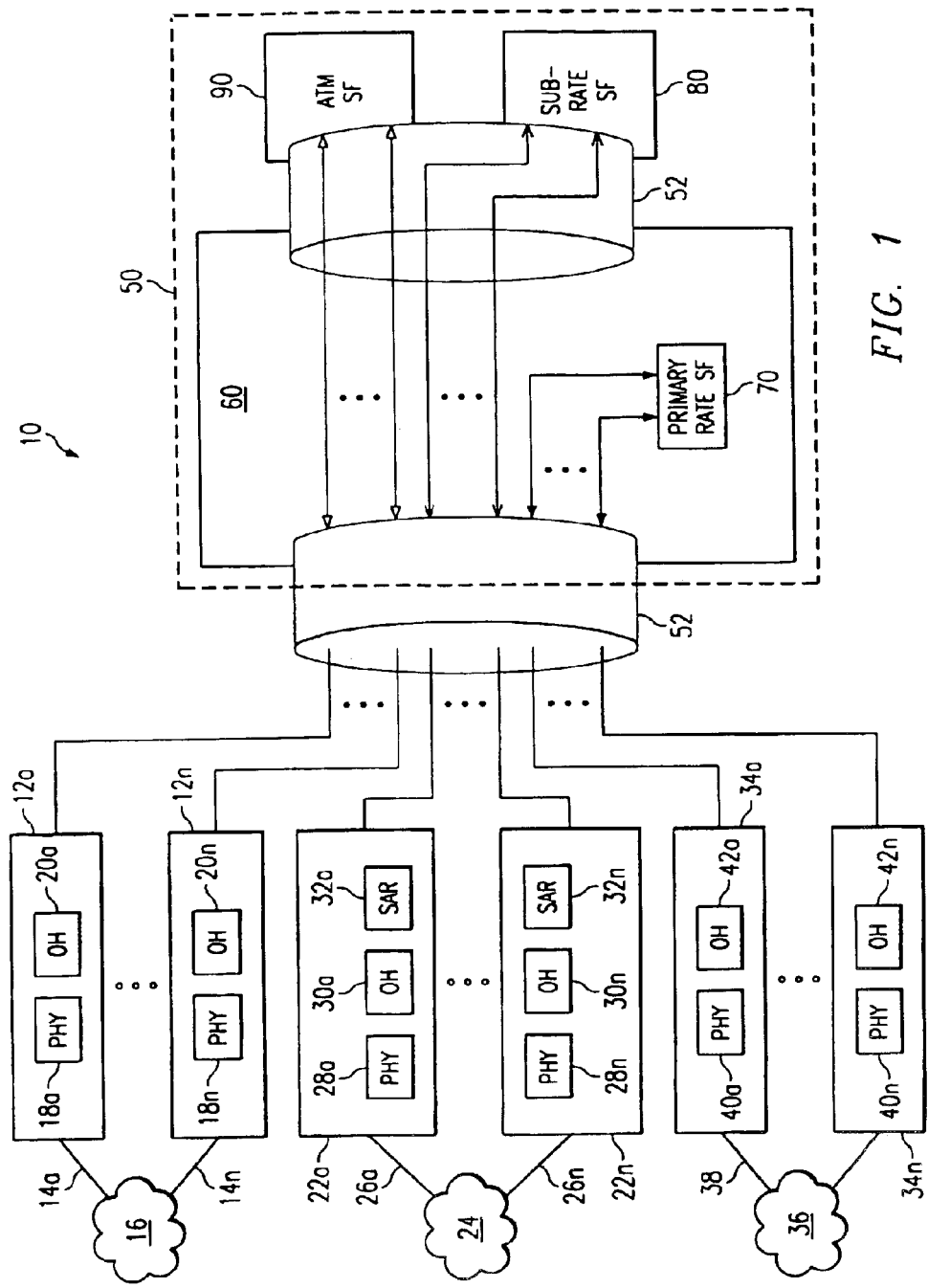
FIG. 1 is a block diagram of an exemplary system operable to facilitate communication of asynchronous transfer mode cells and time-division multiplexed information according to the teachings of the present invention.

FIG. 1 is a block diagram of an exemplary system 10 operable to facilitate communication of asynchronous transfer mode (ATM) cells and time-division multiplexed (TDM) information according to the teachings of the present invention. Throughout this description, the terms "asynchronous transfer mode" and "ATM" contemplate not only current versions and standards defining cell transfer techniques, but also other later revisions, modifications, enhancements, or new types of fixed-length and/or variable-length cell transfer technologies.

System 10 includes a plurality of line cards 12a–12n operable to provide an interface between a switching complex 50 and communication links 14a–14n coupled to a network 16. Throughout this document, the term "coupled" is broad enough to encompass direct or indirect communication between two or more elements said to be "coupled" to one another. The term "coupled" may or may not denote a physical connection between the coupled elements.

In the illustrated embodiment, network 16 comprises a public switched telephone network (PSTN). Network 16 may comprise any suitable wireline or wireless system, or combination thereof, operable to support communication between various network elements. For example, network 16 may comprise an integrated services digital network (ISDN), a local area network (LAN), a wide area network (WAN), a global computer network, such as the Internet or other dedicated switched network, or other communication systems or combination of communication systems at one or more locations.

Communication links 14 may comprise any medium or combination of mediums operable to facilitate transmission of optical and/or electrical signals. In the illustrated embodiment, communication links 14 comprise fiber links carrying optical carrier (OC-n) signals or synchronous transport module (STM-n) signals containing asynchronous transfer mode cells and/or time-division multiplexed information. Although the invention applies equally to synchronous optical network (SONET) and synchronous digital hierarchy (SDH) networks, for clarity of description the illustrated embodiment is described with respect to a SONET configuration. Those skilled in the art will recognize that SDH signal transfer techniques apply equally to the inventive concepts disclosed.

Each line card 12 includes physical layer devices (PHY) 18 operable to perform, for example framing functions on incoming and outgoing signals. For example, where line card 12 receives an OC-n signal, physical layer devices 18 operate to retrieve individual transport signals, for example, synchronous transport signal level-n (STS-n) signals. Where line cards 12 receive, for example, DS-1 or DS-3 signals (referred to generally as "DS-n signals"), physical layer devices 18 operate to map the DS-n signals into transport signals for processing within system 10. Throughout this description, the term "transport signal" refers to a signal format used to transport information within signal complex 50. These transport signals may comprise, for example, STS-1, STS-3c, or STS-12 signal formats. Alternatively, the invention could implement SDH analogs of these signals.

Each line card 12 further includes overhead processors (OH) 20 operable to extract overhead information from incoming signals and insert overhead information into outgoing signals.

System further includes a plurality of tributary cards 22a–22n. Tributary cards 22 provide an interface between switching complex 50 and various network elements coupled to a network 24 via communication links 26a–26n. In the illustrated embodiment, network 24 comprises a local area network, such as an Ethernet. Tributary cards 22 receive, for example, frame relay signals containing legacy data from network 24. Each tributary card 22 includes physical layer devices 28 and overhead processors 30, which are similar in structure and function to elements 18 and 20 in line cards 12 described above. In addition, each tributary card 22 includes a segmentation and reassembly (SAR) module 32 operable to receive legacy data from network 24, and to segment the legacy data into asynchronous transfer mode cells. Segmentation and reassembly module 12 also operates to convert asynchronous transfer mode cells received from switching complex 50 into legacy data for transmission over network 24.

System 10 may also include various other tributary cards 34a–34n, which provide interfaces between a network 36 and switching complex 50. In the illustrated embodiment, network 36 comprises a public switched telephone network. Other network types and configurations could be used without departing from the scope of the invention. Tributary cards 34 may comprise, for example, OC-3 cell relay (CR) cards, DS-3/EC-1 cards, DS-1 cards, frame relay cards, DS-1 Inverse Multiplexing (DS-1 IMA) cards, or any combination of these or other signal format cards. Each tributary card 34 includes physical layer devices (PHY) 40 operable to extract transport signals from incoming signals and to map incoming signals into transport signals for transmission to switching complex 50. Each tributary card 34 also includes overhead processors 42 operable to extract overhead information from incoming signals and to map overhead information into outgoing signals.

System 10 includes a switching complex 50, which communicates with line cards 12 and tributary cards 22 over a communication link 52. Throughout this document, the terms such as "communicate" and "receive" are intended to encompass both direct and indirect communication between system elements. In this embodiment, communication link 52 comprises a backplane, and switching complex 50 comprises one or more circuit cards operable to communicate with backplane 52. Switching complex 50 includes a switching center 60 in communication with a primary rate switching fabric 70, a sub-rate switching fabric 80, and an asynchronous transfer mode switching fabric 90. In this embodiment, primary rate switching fabric 70 resides on the same physical card as switching center 60, while sub-rate switching fabric 80 and asynchronous transfer mode switching fabric 90 reside on separate physical cards.

Configuring switching complex 60 so that sub-rate switching fabric 90 and asynchronous transfer mode switching fabric 90 each reside on separate physical cards provides an advantage of facilitating interchangability between the switching fabrics. This type of design facilitates customizing bandwidth allocation in switching complex 50 according to the traffic patterns of various applications. This configuration also facilitates application of the invention to a wide variety of network applications and accommodates changes in network demands as systems evolve. Although the illustrated embodiment depicts a particular physical configuration, the invention contemplates any physical arrangement of the various switching fabrics and is not intended to be limited by the arrangement shown in the illustrated embodiment.

In operation, system 10 receives a plurality of incoming signals from, for example, networks 16, 24, and 36. Some of these signals may contain time-division multiplexed information and/or asynchronous transfer mode cells to be switched at a particular rate, referred to as the "primary rate." Throughout this document, the term "primary rate" refers to a level of switching offered by switching complex 50 that is less granular than the level offered by a "sub-rate" switching fabric. In this embodiment, the primary rate comprises a synchronous transfer signal level-1 (STS-1) rate. Others of the incoming signals may contain time-division multiplexed information requiring sub-rate signal processing. For example, some of the incoming signals may contain virtual tributary (VT) traffic requiring signal switching at a more granular rate than the primary rate. This type of switching is referred to throughout this description as "sub-rate switching." In the illustrated embodiment, sub-rate switching may comprise switching of virtual tributary traffic carried by the incoming transport signals. Still others of the incoming signals may include asynchronous transfer mode cells. Of the incoming signals containing asynchronous transfer mode cells, some may require asynchronous transfer mode layer processing, while others comprise pass-through traffic.

System 10 receives these incoming signals at line cards 12 and tributary cards 22 and 34. Line cards 12 and tributary cards 22 and 34 are referred to generally as interface cards. Each of the interface cards includes physical layer devices (PHY) 18, 28, and 40, which receive the incoming signals in various signal formats, and translate the various incoming signal formats into transport signals. In some cases, transport signals are formed by extracting portions of larger signals received at the interface cards, while in other cases transport signals are formed by mapping more granular signals received at the interface cards into larger transport signals. In the illustrated embodiment, the transport signals comprise synchronous transport signal level-n (STS-n) signals.

The transport signals are transmitted across backplane 52 to an appropriate switching fabric 70, 80, or 90, depending on the processing needs associated with that signal. Primary switching rate fabric 70 receives transport signals carrying time-division multiplexed traffic not requiring sub-rate switching and transport signals carrying asynchronous transfer mode traffic not requiring asynchronous transfer mode layer processing. Primary rate switching fabric receives these signals and switches the signals at a primary switching rate, in this case an STS-1 level switching rate.

Transport signals carrying time-division multiplexed information requiring sub-rate switching are routed to sub-rate switching fabric 80. In the illustrated embodiment, sub-rate switching fabric 80 comprises a virtual tributary cross-connect, operable to perform virtual tributary signal switching on the incoming transport signals.

Transport signals containing asynchronous transfer mode cells requiring asynchronous transfer mode layer processing are routed to asynchronous transfer mode switching fabric 90 through backplane 52. In the illustrated embodiment, asynchronous transfer mode switching fabric 90 comprises an asynchronous transfer mode add/drop multiplexer operable to perform asynchronous transfer mode cell cross-connection at a virtual path (VP) or a virtual circuit (VC) level.

Switching center 60 receives switched transport signals from primary rate switching fabric 70, sub-rate switching fabric 80, and asynchronous transfer mode switching fabric 90. These signals are passed back to line cards 12 and/or tributary cards 22 and 34, where physical layer devices convert the transport signals into formats appropriate for transmission across networks 16, 24, and/or 36.

System 10 provides significant flexibility in communicating signals containing various types of information and requiring various levels of signal switching. Through this flexible design, system 10 facilitates, for example, processing signals containing time-division multiplexed information requiring virtual tributary cross-connection, signals containing asynchronous transfer mode information requiring asynchronous transfer mode layer processing, and pass-through signals requiring only primary rate switching. This flexibility allows system 10 to excel in a variety of network environments and adapt as particular network implementations evolve.

Figure 2:
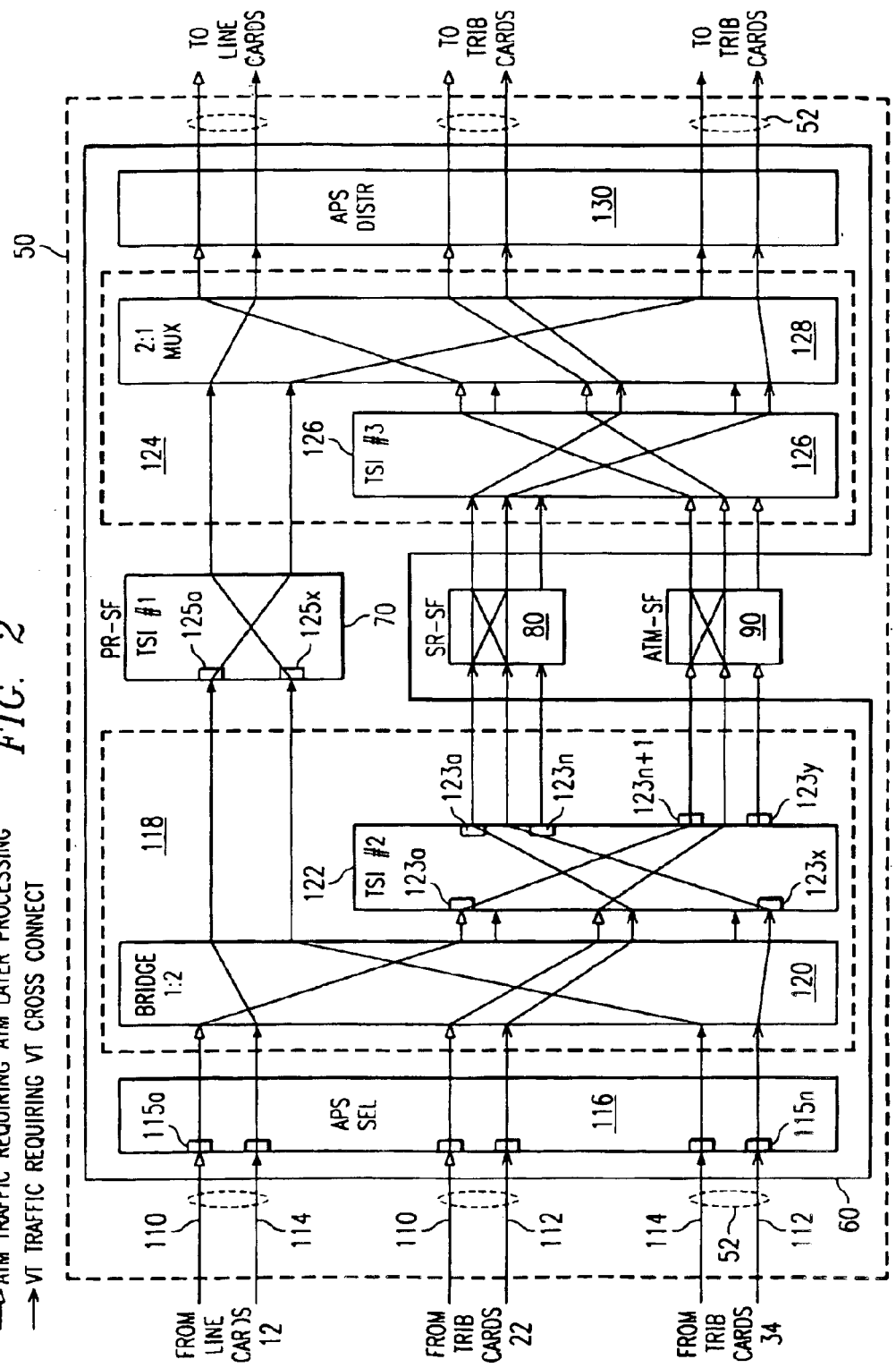
FIG. 2 is a block diagram showing an exemplary embodiment of a switching complex constructed according to the teachings of the present invention.

FIG. 2 is a block diagram showing an exemplary embodiment of switching complex 50. Switching complex 50 includes a switching center 60, which receives incoming transport signals from line cards 12 and tributary cards 22 and 34. In this embodiment, transport signals received at switching center 60 can be classified into three categories: (i) incoming transport signals 110 carrying asynchronous transfer mode traffic requiring layer processing (asynchronous transfer mode traffic); (ii) incoming transport signals 112 carrying sub-rate traffic requiring sub-rate cross-connection (sub-rate traffic); and (iii) pass-through incoming signals 114 carrying either pass-through asynchronous transfer mode traffic or pass-through time-division multiplexed traffic (primary rate traffic).

Switching center 60 includes an automatic protection switching selector (APS SEL) 116, which receives incoming transport signals from backplane 52. Automatic protection switching selector 116 determines, based on whether a fault has occurred, whether traffic from a working channel or a protection channel should be processed. Automatic protection switching selector 116 includes a plurality of ports 115a–115n for receiving the incoming transport signals. In this particular embodiment, switching complex 50 receives an equivalent bandwidth of 240 STS-1 signals. Switching complex 50 could alternatively receive and process other bandwidths of signals. Particular bandwidths expressed in this description are for illustrative purposes only.

Switching center 60 also includes a signal distributor 118, which is coupled between line cards 12 and tributary cards 22 and 34, and switching fabrics 70, 80, and 90 of switching complex 50. Signal distributor 118 operates to receive asynchronous transfer mode traffic 110, sub-rate traffic 112, and primary rate traffic 114 and to route these signals to a switching fabric operable to perform switching functions for each type of signal.

In the illustrated embodiment, signal distributor 118 comprises a signal bridge 120 operable to multiply incoming transport signals 110–114 to create a duplicate set of transport signals 110–114. In the illustrated embodiment, signal distributor 118 further includes a time slot interchange 122 (TSI #2). In this embodiment, time slot interchange 122 receives a full set of incoming transport signals 123a–123x. Time slot interchange 122 rearranges the incoming transport signals so that at least sub-rate traffic 112 is associated with time slots 123a–123n, and at least asynchronous transfer mode traffic 110 is associated with time slots 123n+1–123y.

In some embodiments, time slot interchange 122 outputs the same number of signals it receives. In that case the value of "x" in 123x equals the value of "y" in 123y. In other cases, switching center 50 may receive more incoming transport signals than sub-rate switching fabric 80 and/or asynchronous transfer mode switching fabric 90 will accept. In those cases, time slot interchange 122 can operate to compress incoming transport signals into a number of signals acceptable to switching fabrics 80 and 90. In that embodiment, the number of signals "y" is less than the number of signals "x."

Sub-rate switching fabric 80 receives information from time slots 123a–123n of time slot interchange 122. asynchronous transfer mode switching fabric 90 receives information from time slots 123n+1–123y of time slot interchange 122. Primary rate switching fabric (TSI #1) receives a full set of incoming transport signals at time slots 125a–125x.

Through this configuration, each signal type is routed to a switching fabric operable to perform appropriate switching on that signal type. In a particular embodiment, sub-rate switching fabric 80 comprises a virtual tributary cross-connect operable to switch time-division multiplexed traffic at a virtual tributary level; asynchronous transfer mode switching fabric 90 comprises an add/drop multiplexer operable to perform virtual path or virtual circuit cross-connection; and primary rate switching fabric 70 comprises a time slot interchange operable to perform STS level switching. Primary rate switching fabric 80 and sub-rate switching fabric 80 could provide other levels of granularity of switching, depending on the application. In addition, additional sub-rate switching fabrics could be implemented to provide additional levels of granularity in switching.

Switching center 60 further includes a signal selector 124, which receives switched transport signals from primary rate switching fabric 70, sub-rate switching fabric 80, and asynchronous transfer mode switching fabric 90. Signal selector 124 operates to route switched transport signals 110–114 to appropriate ports for transmission to line cards 12, tributary cards 22, and/or tributary cards 34. In this particular embodiment, signal selector 124 includes a time slot interchange (TSI #3) 126 operable to receive switched transport signals from sub-rate switching fabric 80 and asynchronous transfer mode switching fabric 90, and to rearrange the switched transport signals so that they are again matched with the time slots on which they were originally received at time slot interchange 122. In embodiments where time slot interchange 122 was used to compress incoming transport signals, time slot interchange 126 can be used to decompress the compressed signals to recover the original number of transport signals.

In the illustrated embodiment, signal selector 124 also includes a multiplexer 128, operable to receive a set of switched transport signals from primary rate switching fabric 70 and a set of switched transport signals from time slot interchange 126. Multiplexer 128 selects from the multiple sets of switched transport signals it receives to obtain a set of selected switched transport signals. In the illustrated embodiment, multiplexer 128 comprises a 2:1 multiplexer operable to receive and process two sets of switched transport signals. Alternatively, multiplexer 128 could comprise an N:1 multiplexer operable to receive additional sets of switched transport signals from an additional number of sub-rate switching fabrics.

Switching center 60 also includes an automatic protection switching distribution circuit (APS DISTR) 130. Automatic protection switching distribution circuit 130 receives the selected switched transport signals from selector 124, and distributes copes of these signals to both working and protection channels.

In operation, switching complex 50 receives a plurality of incoming transport signals from line cards 12, tributary cards 22, and/or tributary cards 34. Automatic protection selection circuit 116 determines, based on whether a fault has been detected, whether to process traffic from working channels or protection channels. Incoming transport signals are next routed to signal distributor 118, which routes at least the primary rate traffic to primary rate switching fabric 70, at least the sub-rate traffic to sub-rate switching fabric 80, and at least the asynchronous transfer mode traffic to asynchronous transfer mode switching fabric 90.

In a particular embodiment, bridge 120 receives incoming transport signals and multiplies those signals to create at least one duplicate set of incoming transport signals. One set of the incoming transport signals is routed to primary rate switching fabric 70, which receives pass-through traffic and switches that traffic at a primary rate, in this case an STS-1 rate. Another set of the incoming transport signals is routed to time slot interchange 122, which associates sub-rate traffic 112 with time slots 123a–123n, and associates asynchronous transfer mode traffic 114 with time slots 123n+1–123y. Sub-rate switching fabric 80 is configured to receive signals from time slots 123a–123n, and asynchronous transfer mode switching fabric 90 is configured to receive information from time slots 123n+1–123y.

Each switching fabric performs its corresponding switching function on selected ones of the incoming transport signals to form switched transport signals. The switched transport signals are received at signal selector 124, which operates to associate switched transport signals with particular line cards 12, tributary cards 22, and/or tributary cards 34. In this particular embodiment, time slot interchange 126 of signal selector 124 receives switched transport signals from sub-rate switching fabric 80 and asynchronous transfer mode switching fabric 90. Time slot interchange 126 rearranges the switched transport signals to again associate each signal with the time slot on which it was originally received at time slot interchange 122. In addition, time slot interchange 126 may decompress switched transport signals to derive the original number of transport signals received at time slot interchange 122.

Multiplexer 128 receives two sets of switched transport signals; one from primary rate switching fabric 70 and one from time slot interchange 126. Multiplexer 128 identifies appropriate switched transport signals, and passes those signals to automatic protection switching distributor 130. Automatic protection switching distributor 130 distributes the switched transport signals to working and protection channels.

FIG. 3 is a flow chart showing an exemplary method 200 of communicating time-division multiplexed information and asynchronous transfer mode cells in a communication network. The method 200 begins at step 210 where switching complex 50 receives a plurality of transport signals to be switched at one or more switching granularities. In a particular embodiment, the method 210 of receiving transport signals includes step 212, where switching complex 50 receives pass-through traffic requiring primary rate switching. This pass-through traffic may carry time-division multiplexed information, asynchronous transfer mode cells, or a combination of the two. In the illustrated embodiment pass-through traffic comprises STS-1 signals. In this particular embodiment, switching complex 50 also receives sub-rate traffic requiring sub-rate switching at that step 214. In the illustrated embodiment, sub-rate traffic comprises STS-1 signals carrying virtual tributary traffic requiring virtual tributary switching. Switching complex 50 further receives asynchronous transfer mode traffic requiring asynchronous transfer mode cell switching at that step 216.

Switching complex 50 communicates the incoming transport signals to switching fabrics operable to provide a level of switching commensurate with the needs of each signal at step 220. In a particular embodiment, the method 220 includes step 222, where signal distributor 118 receives the incoming transport signals and duplicates those signals to form a first set of incoming transport signals and a second set of incoming transport signals. Signal distributor 118 communicates the first set of transport signals to primary rate switching fabric 70 at step 224. Signal distributor 118 communicates the second set of transport signals to time slot interchange 122 at step 226. Time slot interchange 122 associates ones of the second set of transport signals carrying sub-rate traffic with a first range of time slots at step 228. In a similar matter, time slot interchange 122 associates ones of the second set of transport signals carrying asynchronous transfer mode traffic with a second range of time slots at step 230. Switching complex 50 is configured so that signals assigned to the first range of time slots are eventually communicated to sub-rate switching fabric 80, and signals assigned to the second range of time slots are eventually communicated to asynchronous transfer mode switching fabric 90.

Time slot interchange 122 communicates sub-rate traffic to sub-rate switching fabric 80 at step 232. In a similar manner, time slot interchange 122 communicates asynchronous transfer mode traffic to asynchronous transfer mode switching fabric 90 at step 234. Switching complex 50 switches each transport signal at a switching level appropriate for that signal at step 240. For example, primary rate switching fabric 70 switches pass-through traffic at a primary switching rate, in this case an STS-1 rate; sub-rate switching fabric 80 switches sub-rate traffic at a switching rate that is more granular than the primary switching rate, in this case a virtual tributary switching rate; and asynchronous transfer mode switching fabric 90 performs asynchronous transfer mode layer processing on the asynchronous transfer mode traffic received.

Switching complex 50 facilitates communication of switched transport signals to interface cards (e.g., interface cards 12, 22, and/or 34) for eventual transmission to external network elements at step 250. In the illustrated embodiment, the method 250 of communicating switched transport signals to the interface cards includes step 252, where switched time slot interchange 126 reassociates sub-rate traffic with the time slots on which the sub-rate traffic was originally received. Similarly, time slot interchange 126 reassociates switched asynchronous transfer mode traffic at step 254 with time on which the asynchronous transfer mode traffic was originally received.

Multiplexor 128 of signal selector 124 receives a first set of switched transport signals from primary rate switching fabric 70 at step 256. This first set of switched transport signals includes pass-through traffic that has been switched at the primary rate. Multiplexor 128 also receives a second set of switched transport signals at step 258, which include switched sub-rate traffic and switched asynchronous transfer mode traffic. Multiplexor 128 selects switched transport signals from the first and second sets of transport signals at step 260 for communication to the interface cards (e.g., cards 12, 22, and/or 34), and communicates the selected switched transport signals to the interface cards at step 262.

The invention provides significant advantages in facilitating transmission of a variety of signal formats while providing various levels of processing to those signals. In particular, the invention allows sub-rate and ATM layer processing on particular signals without delaying transmission of other pass-through traffic.

Although the present invention has been described in several embodiments, a myriad of changes, variations, alterations, transformations, and modifications may be suggested to one skilled in the art, and it is intended that the present invention encompass such changes, variations, alterations, transformations, and modifications as fall within the spirit and scope of the appended claims.

What is claimed is:

1. A system operable to communicate time-division multiplexed information and asynchronous transfer mode cells, comprising:
    a primary rate switching fabric operable to receive a first plurality of transport signals and to switch the first plurality of transport signals at a first level;
    a sub-rate switching fabric operable to receive a second plurality of transport signals carrying time-division multiplexed information and to switch the second plurality of transport signals at second level that is a more granular level than the first level; and
    an asynchronous transfer mode switching fabric operable to receive a third plurality of transport signals carrying asynchronous transfer mode cells, and to switch asynchronous transfer mode cells among the third plurality of transport signals carrying asynchronous transfer mode cells.

2. The system of claim 1, wherein the primary rate switching fabric comprises a first time slot interchange operable to switch the primary rate signals at a synchronous transport level-one level.

3. The system of claim 1, wherein the sub-rate switching fabric comprises a digital cross-connect operable to switch the primary rate signals at a virtual tributary level.

4. The system of claim 1, wherein the asynchronous transfer mode switching fabric comprises an asynchronous transfer mode add/drop multiplexer operable to perform asynchronous transfer mode layer processing.

5. The system of claim 1, further comprising a second time slot interchange operable to receive the transport signals, to route the second plurality of transport signals to the sub-rate switching fabric, and to route the third plurality of transport signals to the asynchronous transfer mode switching fabric.

6. The system of claim 1, further comprising a signal distributor operable to receive the first, second, and third pluralities of transport signals and to communicate each of the pluralities of transport signals to its associated switching fabric.

7. The system of claim 6, wherein the signal distributor comprises:
    a bridge operable to duplicate the first, second, and third pluralities of transport signals, and to send one copy of the transport signals to the primary switching fabric and another copy of the transport signals to a second time slot interchange; and
    the second time slot interchange operable to receive the transport signals, to route the second plurality of transport signals to the sub-rate switching fabric, and to route the third plurality of transport signals to the asynchronous transfer mode switching fabric.

8. The system of claim 6, further comprising a signal selector operable to receive switched transport signals from the primary rate switching fabric, the sub-rate switching fabric, and the asynchronous transfer mode switching fabric and to facilitate transmission of the switched transport signals to external network elements.

9. The system of claim 8, wherein the signal selector comprises:
    a third time slot interchange operable to receive switched transport signals from the asynchronous transfer mode switching fabric and the sub-rate switching fabric, and to associate the switched transport signals with time slots on which the transport signals were originally received in the second time slot interchange; and
    a multiplexer operable to receive switched transport signals from the primary rate switching fabric and the third time slot interchange, and to select a set of switched transport signals for transmission.

10. A system operable to communicate a plurality of signals having various signal formats including time-division multiplexed signals and signals carrying asynchronous transfer mode cells, the system comprising:
    an interface card operable to receive a plurality of incoming signals, to format the incoming signals into transport signals, to route the transport signals to at least one of a plurality of switching fabrics, to receive switched transport signals from at least one of the switching fabrics, and to facilitate transmission of the switched transport signals;
    a primary rate switching fabric operable to receive a first plurality of transport signals and to switch the first plurality of transport signals at a first level;
    a sub-rate switching fabric operable to receive a second plurality of transport signals carrying time-division multiplexed information and to switch the second plurality of transport signals at second level that is a more granular level than the first level; and
    an asynchronous transfer mode switching fabric operable to receive a third plurality of transport signals carrying asynchronous transfer mode cells, and to switch asynchronous transfer mode cells among the third plurality of transport signals carrying asynchronous transfer mode cells.

11. The system of claim 10, wherein the interface card comprises a line card operable to provide an interface between a communications line and at least one of the switching fabrics.

12. The system of claim 10, wherein the interface card comprises a tributary card operable to provide an interface between a tributary and at least one of the switching fabrics.

13. The system of claim 10, further comprising a second time slot interchange operable to receive the transport signals, to route the second plurality of transport signals to the sub-rate switching fabric, and to route the third plurality of transport signals to the asynchronous transfer mode switching fabric.

14. The system of claim 10, further comprising a signal distributor operable to receive the first, second, and third pluralities of transport signals and to communicate each of the pluralities of transport signals to its associated switching fabric.

15. The system of claim 14, wherein the signal distributor comprises:
a bridge operable to duplicate the first, second, and third pluralities of transport signals, and to send one copy of the transport signals to the primary switching fabric and another copy of the transport signals to a second time slot interchange; and
the second time slot interchange operable to receive the transport signals, to route the second plurality of transport signals to the sub-rate switching fabric, and to route the third plurality of transport signals to the asynchronous transfer mode switching fabric.

16. The system of claim 14, further comprising a signal selector operable to receive switched transport signals from the primary rate switching fabric, the sub-rate switching fabric, and the asynchronous transfer mode switching fabric and to facilitate transmission of the switched transport signals to external network elements.

17. The system of claim 16, wherein the signal selector comprises:
a third time slot interchange operable to receive switched transport signals from the asynchronous transfer mode switching fabric and the sub-rate switching fabric, and to associate the switched transport signals with time slots on which the transport signals were originally received in the second time slot interchange; and
a multiplexer operable to receive switched transport signals from the primary rate switching fabric and the third time slot interchange, and to select a set of switched transport signals for transmission.

18. An interface card operable to interface a communication system having a switching complex operable to receive and process a plurality of transport signals carrying time-division multiplexed information and a plurality of transport signals carrying asynchronous transfer mode cells, wherein the switching complex comprises:
a primary rate switching fabric operable to receive a first plurality of transport signals and to switch the first plurality of transport signals at a first level;
a sub-rate switching fabric operable to receive a second plurality of transport signals carrying time-division multiplexed information and to switch the second plurality of transport signals at second level that is a more granular level than the first level; and
an asynchronous transfer mode switching fabric operable to receive a third plurality of transport signals carrying asynchronous transfer mode cells, and to switch asynchronous transfer mode cells among the third plurality of transport signals carrying asynchronous transfer mode cells.

19. A method of communicating time-division multiplexed information and asynchronous transfer mode cells using a single switching complex, the method comprising:
receiving at the switching complex a plurality of transport signals comprising:
a first transport signal comprising pass-through traffic requiring primary rate switching;
a second transport signal comprising sub-rate traffic requiring sub-rate switching; and
a third transport signal comprising asynchronous transfer mode cells requiring asynchronous transfer mode cell switching;
communicating each transport signal to a switching fabric operable to perform a switching function associated with that signal;
performing primary rate switching on the first transport signal;
performing sub-rate switching on the second transport signal; and
performing asynchronous transfer mode cell switching on the third transport signal.

20. The method of claim 19, wherein communicating each transport signal comprises:
duplicating the transport signals;
communicating a first set of transport signals to the primary rate switching fabric;
communicating a second set of transport signals to the sub-rate switching fabric and the asynchronous transfer mode switching fabric.

21. The method of claim 20, wherein communicating the second set of transport signals comprises:
communicating the second set of transport signals to a second time slot interchange;
associating the second plurality of transport signals with a first range of time slots associated with the sub-rate switching fabric;
associating the third plurality of transport signals with a second range of time slots associated with the asynchronous transfer mode switching fabric;
transmitting the second plurality of transport signals to the sub-rate switching fabric; and
and transmitting the third plurality of transport signals to the asynchronous transfer mode switching fabric.

22. The method of claim 19, further comprising:
receiving a first plurality of switched transport signals from the primary rate switching fabric;
receiving a second plurality of switched transport signals from the sub-rate switching fabric;
receiving a third plurality of switched transport signals from the asynchronous transfer mode switching fabric; and
communicating the first, second, and third pluralities of switched transport cells to an interface card for transmission to an external network element.

23. The method of claim 21, further comprising:
receiving from primary rate switching fabric a first plurality of switched transport signals at a first set of a third time slot interchange;
receiving from the sub-rate switching fabric a second plurality of switched transport signals at a second set of time slots of a third time slot interchange; and
associating the first and second pluralities of switched transport signals with time slots corresponding to the time slots of the second time slot interchange on which the transport signals were originally received.

* * * * *

UNITED STATES PATENT AND TRADEMARK OFFICE
CERTIFICATE OF CORRECTION

PATENT NO. : 6,891,836 B1 Page 1 of 1
APPLICATION NO. : 09/325698
DATED : May 10, 2005
INVENTOR(S) : Chen et al.

It is certified that error appears in the above-identified patent and that said Letters Patent is hereby corrected as shown below:

On Title Page,
Inventors (75), Line 5, delete "Shimbashi" and insert -- Shibashi --.
Column 7, Line 26, after "distributes" delete "copes" and insert -- copies --.
Column 12, Line 54, after "receiving from" insert -- the --.
Column 12, Line 55, after "first set of" insert -- time slots of --.

Signed and Sealed this

Nineteenth Day of December, 2006

JON W. DUDAS
*Director of the United States Patent and Trademark Office*